US012528160B2

(12) United States Patent
Chen

(10) Patent No.: US 12,528,160 B2
(45) Date of Patent: Jan. 20, 2026

(54) INDEXABLE WRENCH

(71) Applicant: INFAR INDUSTRIAL CO., LTD., Chang-Hua County (TW)

(72) Inventor: Tai Hung Chen, Chang-Hua County (TW)

(73) Assignee: Infar Industrial Co., Ltd., Chang-Hua County (TW)

( * ) Notice: Subject to any disclaimer, the term of this patent is extended or adjusted under 35 U.S.C. 154(b) by 471 days.

(21) Appl. No.: 18/093,577

(22) Filed: Jan. 5, 2023

(65) Prior Publication Data

US 2023/0264326 A1 Aug. 24, 2023

(30) Foreign Application Priority Data

Feb. 18, 2022 (TW) .................................. 111105977

(51) Int. Cl.
*B25B 23/00* (2006.01)
*B25B 13/46* (2006.01)

(52) U.S. Cl.
CPC ........ *B25B 23/0028* (2013.01); *B25B 13/462* (2013.01)

(58) Field of Classification Search
CPC ...... B25B 23/0028; B25G 1/06; B25G 1/063; B25G 3/38
See application file for complete search history.

(56) References Cited

U.S. PATENT DOCUMENTS 2,921,773 A * 1/1960 Hoelzer .................. B66F 15/00 403/103
5,768,960 A 6/1998 Archuleta
6,161,982 A * 12/2000 Cole ..................... B25B 13/481 81/177.8
6,928,904 B2 * 8/2005 Hsien ..................... B25G 1/063 81/177.85
7,591,208 B2 * 9/2009 Cole ...................... B25G 1/025 403/103
7,682,099 B2 * 3/2010 Cole ........................ B25G 1/06 81/58.3
8,646,365 B2 * 2/2014 Hsieh ..................... B25G 1/063 81/177.8

FOREIGN PATENT DOCUMENTS

| | | | |
|---|---|---|---|
| CN | 101041233 | A | 9/2007 |
| CN | 103659705 | B | 4/2016 |
| EP | 3168003 | A1 | 5/2017 |
| TW | I225815 | B | 1/2005 |
| TW | M302435 | U | 12/2006 |
| TW | I412437 | B | 10/2013 |
| TW | I583508 | B | 5/2017 |

* cited by examiner

*Primary Examiner* — Hadi Shakeri
(74) *Attorney, Agent, or Firm* — Muncy, Geissler, Olds & Lowe

(57) ABSTRACT

An indexable wrench includes a first member, a second member and a pivotal member. The first member has a first pivotal lug. The second member has a second pivotal lug and a third pivotal lug. The second pivotal lug includes a first engaging portion and a limiting groove, and a limiting member is arranged in the limiting groove. The pivotal member is movably inserted through the first pivotal lug, the second pivotal lug and the third pivotal lug to movable between a locked position and an unlocked position. The pivotal member includes a second engaging portion engageable with the first engaging portion, a first positioning groove and a second positioning groove engageable with the limiting member.

6 Claims, 10 Drawing Sheets

INDEXABLE WRENCH

BACKGROUND OF THE INVENTION

The present invention relates to a wrench and, more particularly, to an indexable wrench that allows positioning of a handle with respect to a head in a plurality of locking angles.

Taiwan Patent No. TW1412437 discloses a wrench that includes a driving head, a handle, a control member and a positioning assembly. The handle of the wrench and the driving head can be controlled to rotate relative to each other and fixed after rotation by controlling the control member to move within the driving head. Thus, parts cost and assembly cost can be both reduced.

The above wrench obtains a positioning effect when the first engaging portion engages the first tooth, otherwise the handle and the driving head can be rotated relatively when the first engaging portion disengages from the first tooth. However, the positioning assembly can only provide the effect of preventing the control member from breaking away, and the positioning assembly is still possible to move during use to cause the first engaging portion accidentally disengage or engage the first tooth.

Thus, a need exists for an indexable wrench to mitigate and/or obviate the above disadvantages.

SUMMARY OF THE INVENTION

An objective of the present invention is to provide an indexable wrench, which includes a first member, a second member and a pivotal member. The first member has a first pivotal lug provided with a first pivotal hole extending along a reference pivotal axis. The second member has a second pivotal lug and a third pivotal lug. The first pivotal lug is disposed between the second pivotal lug and the third pivotal lug. The second pivotal lug is provided with a second pivotal hole including a first engaging portion and a limiting groove formed in an inner periphery thereof, and a limiting member is arranged in the limiting groove. The third pivotal lug is provided with a third pivotal hole. The pivotal member is movably inserted through the first pivotal hole, the second pivotal hole and the third pivotal hole to movable between a locked position and an unlocked position. The pivotal member includes a second engaging portion, a first positioning groove and a second positioning groove formed in an outer periphery thereof. When the pivotal member is in the locked position, the second engaging portion is engaged with the first engaging portion, and the limiting member is engaged within the first positioning groove, so that the first member and the second member cannot pivot relative to each other. When the pivotal member is in the unlocked position, the limiting member is engaged within the second positioning groove, so that the first member and the second member are pivotable relative to each other.

In an embodiment, the second pivotal lug has a first thickness in an axial direction of the pivotal member, the third pivotal lug has a second thickness in the axial direction of the pivotal member, and the second thickness is less than the first thickness.

In an embodiment, the limiting groove is arranged adjacent to one side of the first engaging portion distal to the first pivotal lug.

In an embodiment, the first pivotal hole includes a third engaging portion formed in an inner periphery thereof, and the pivotal member further includes fourth engaging portion formed in an outer periphery thereof. When the pivotal member is moved between the locked position and the unlocked position, the fourth engaging portion is constantly engaged with the third engaging portion. When the pivotal member is in the unlocked position, the second engaging portion is disengaged from the first engaging portion, so that the pivotal member and the first member are synchronously rotatable relative to the second member.

In an embodiment, the third pivotal hole includes a fifth engaging portion formed in an inner periphery thereof. When the pivotal member is in the locked position, the fourth engaging portion is simultaneously engaged with the third engaging portion and the fifth engaging portion. When the pivotal member is in the unlocked position, the fourth engaging portion is disengaged from the fifth engaging portion.

In an embodiment, the second pivotal hole further includes a containing portion formed in the inner periphery thereof, and the containing portion is adjacent to the first engaging portion and located between the first engaging portion and the limiting groove. When the pivotal member is in the unlocked position, the second engaging portion is disengaged from the first engaging portion and arranged in the containing portion, and the second engaging portion and the containing portion are spaced and not engaged each other.

In an embodiment, a stopping member is arranged in the third pivotal hole and disposed at one side of the fifth engaging portion distal to the first pivotal lug. When the pivotal member is in the locked position, the fourth engaging portion is near the stopping member. When the pivotal member is in the unlocked position, the fourth engaging portion is distal to the stopping member.

In an embodiment, the second engaging portion includes a toothed portion having a dedendum circle diameter in a radial direction of the pivotal axis. The first positioning groove has a first diameter in the radial direction of the pivotal axis, and the first diameter is equal to or less than the dedendum circle diameter. The second positioning groove has a second diameter in the radial direction of the pivotal axis, and the second diameter is equal to or less than the dedendum circle diameter.

In another embodiment, the first pivotal hole includes a third engaging portion formed in an inner periphery thereof. When the pivotal member is moved between the locked position and the unlocked position, the second engaging portion is constantly engaged with the third engaging portion. When the pivotal member is in the unlocked position, the second engaging portion is disengaged from the first engaging portion, so that the pivotal member and the first member are synchronously rotatable relative to the second member.

In another embodiment, a stopping member is arranged in the second pivotal hole and abutted against one side of the limiting member distal to the first pivotal lug. When the pivotal member is in the locked position, the second engaging portion is near the stopping member. When the pivotal member is in the unlocked position, the second engaging portion is distal to the stopping member.

The present invention will become clearer in light of the following detailed description of illustrative embodiments of this invention described in connection with the drawings.

DETAILED DESCRIPTION OF THE INVENTION

Figure 1:
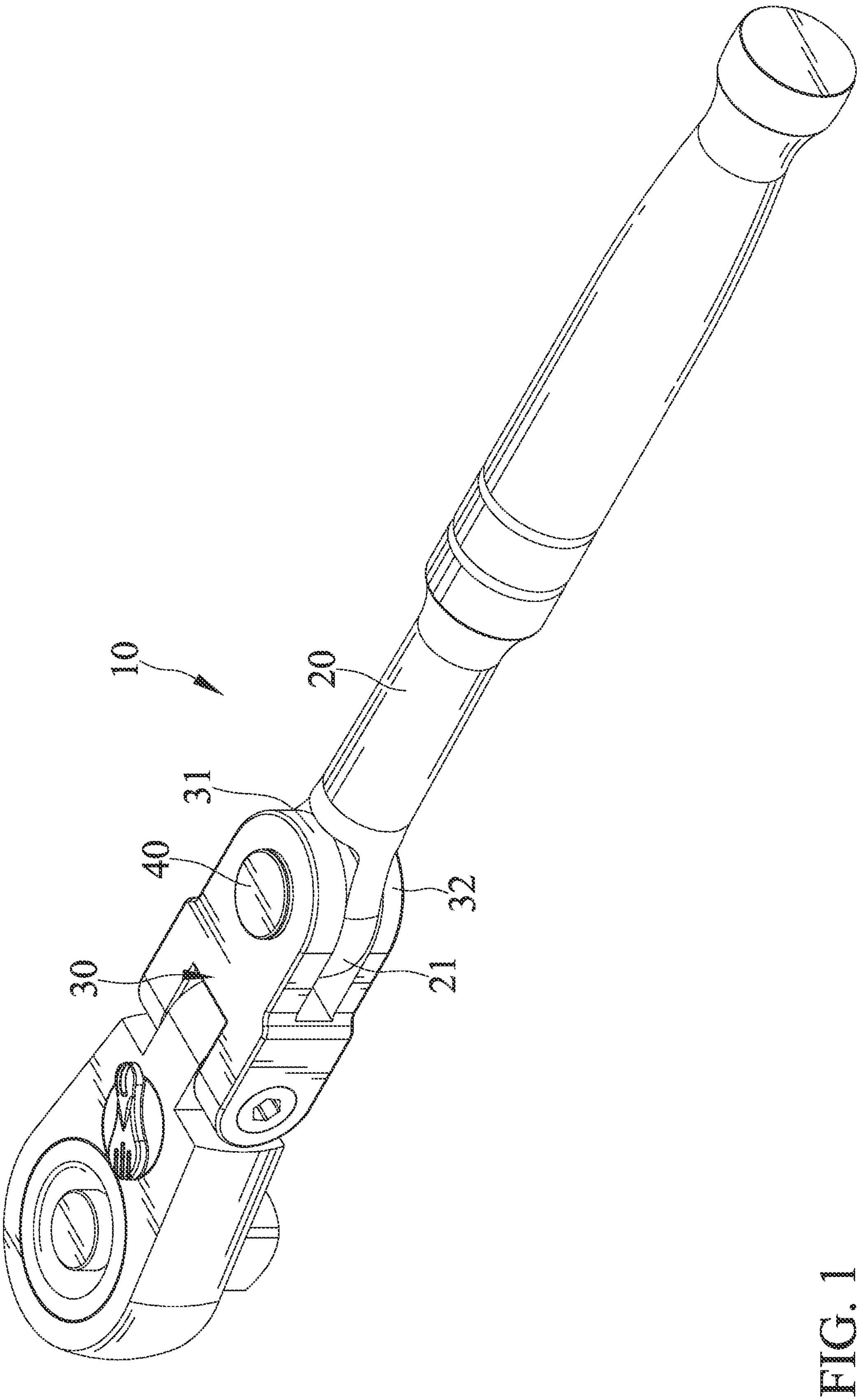
FIG. 1 is a perspective view of an indexable wrench of a first embodiment according to the present invention.
Figure 2:
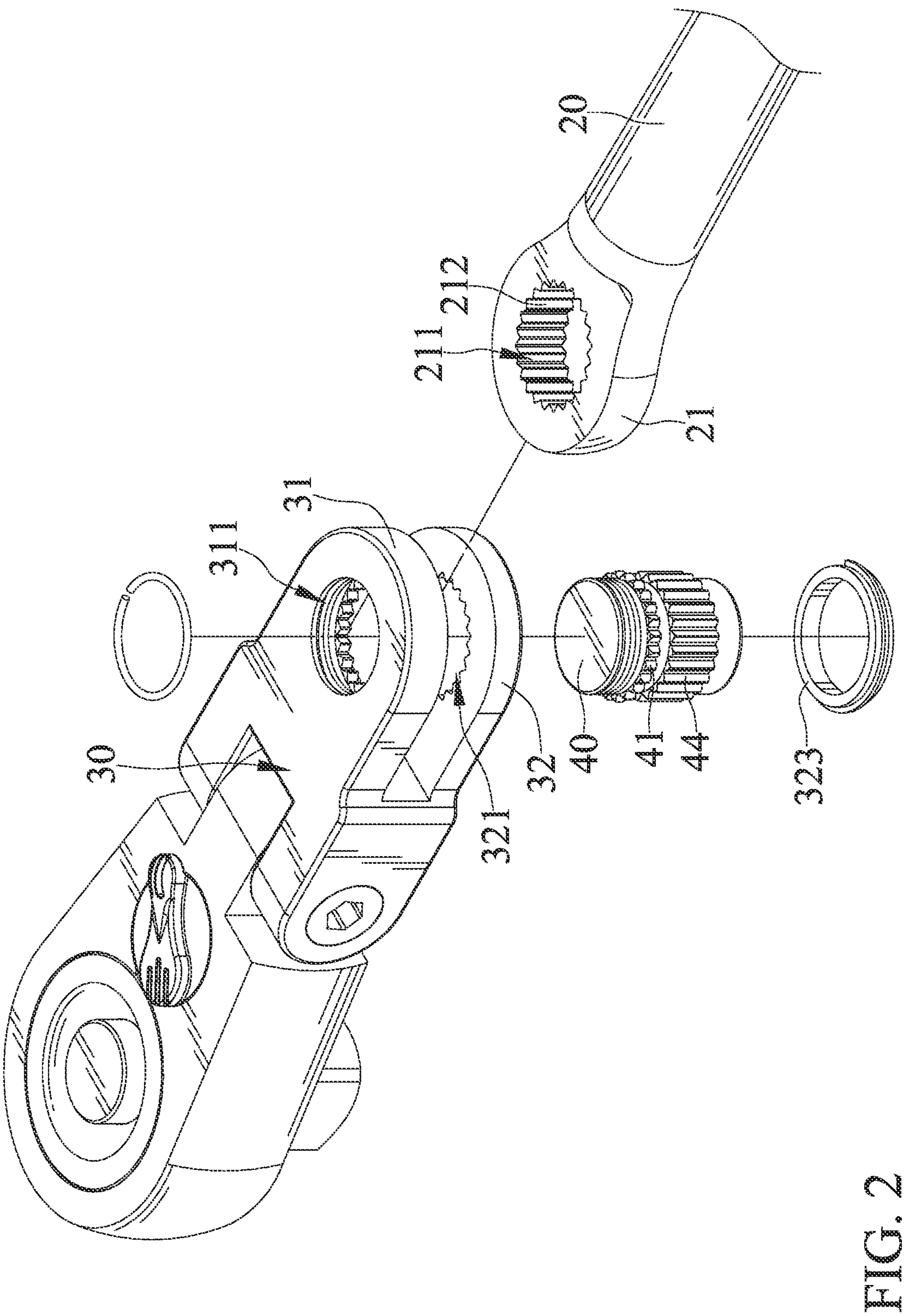
FIG. 2 is a partial, exploded perspective view of the indexable wrench of FIG. 1.
Figure 3:
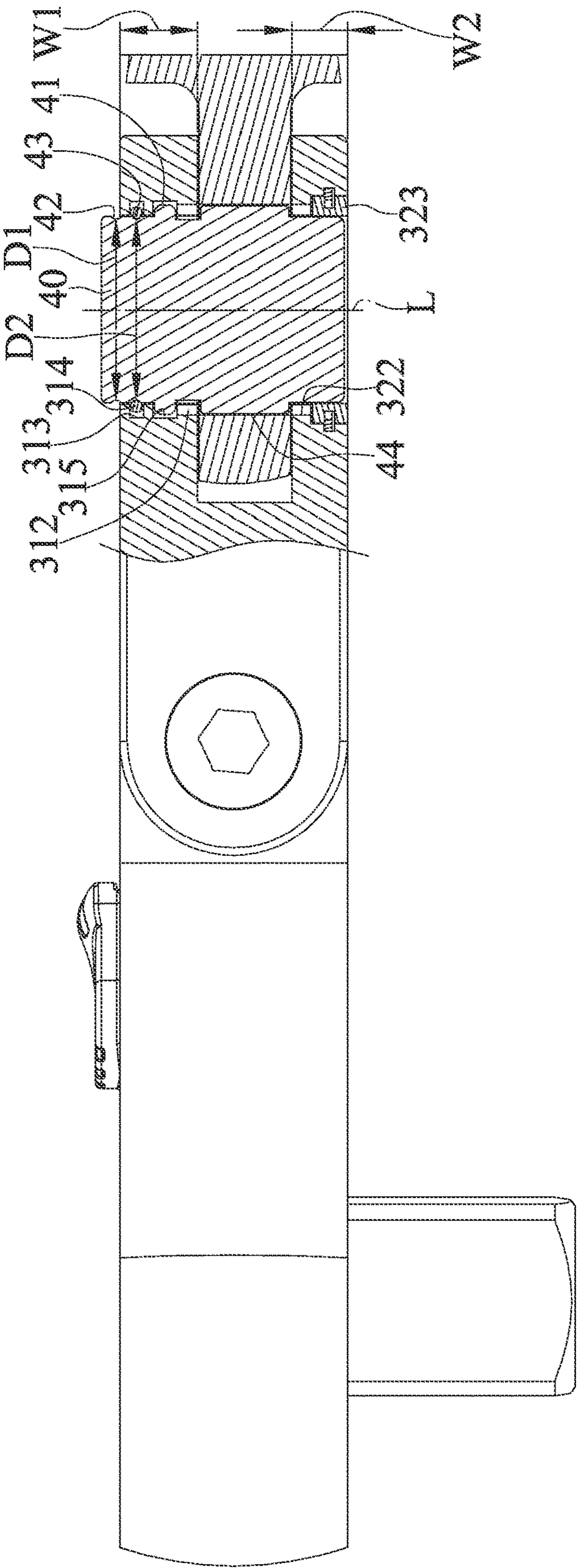
FIG. 3 is a cross sectional view of the indexable wrench of FIG. 1 and shows an pivotal member is in an unlocked position.
Figure 4:
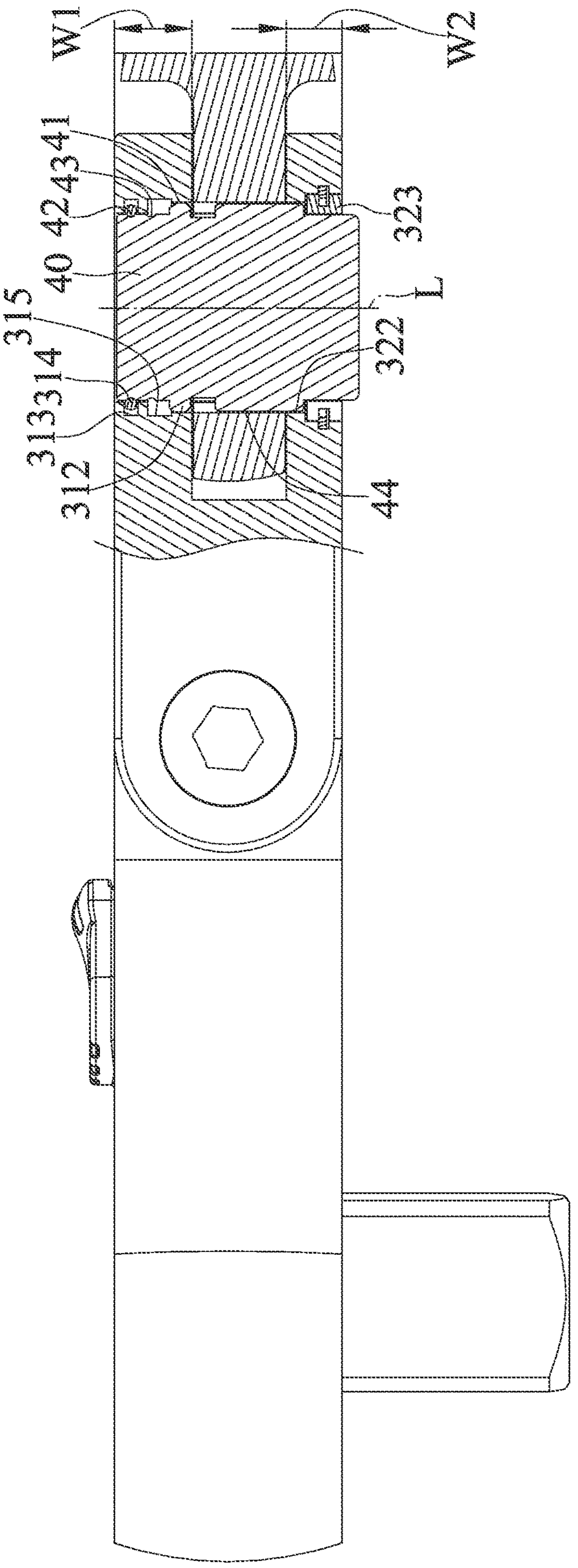
FIG. 4 is a cross sectional view of the indexable wrench of FIG. 1 and shows the pivotal member is in an locked position.
Figure 5:
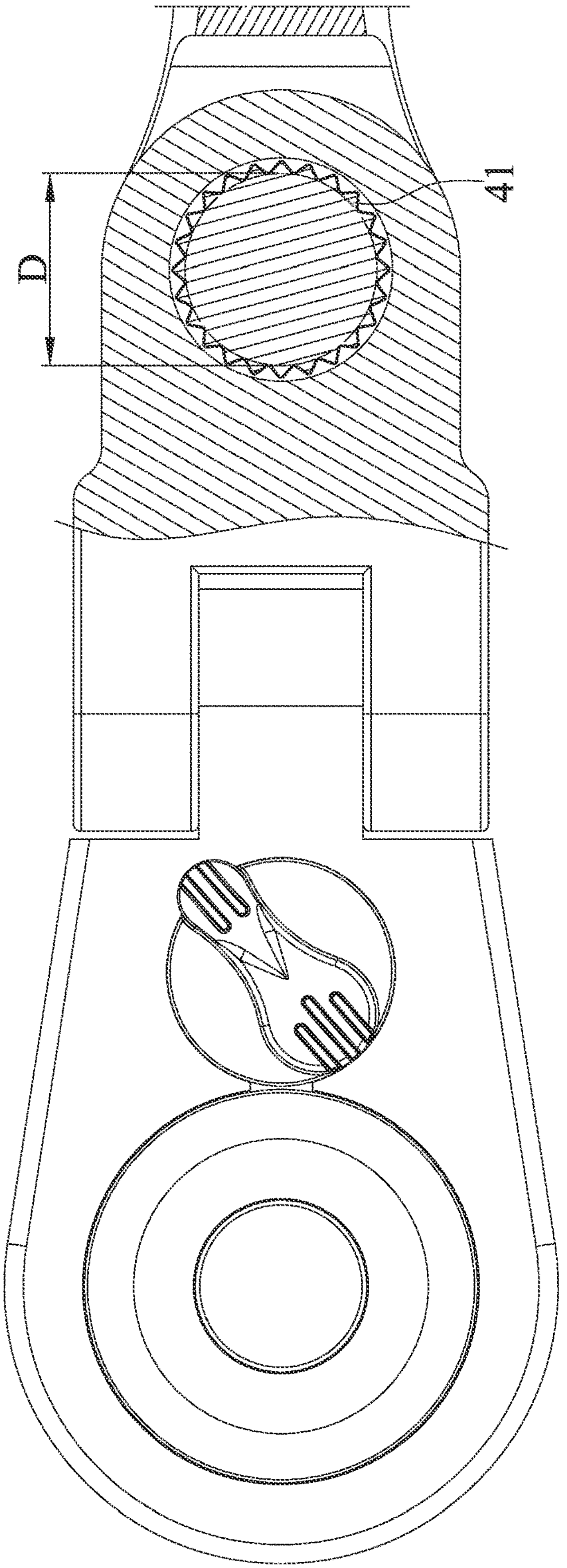
FIG. 5 is another cross sectional view of the indexable wrench of FIG. 1 and shows a second engaging portion with a toothed portion having a dedendum circle diameter.

FIGS. 1-5 show an indexable wrench 10 of a first embodiment according to the present invention. The indexable wrench 10 includes a first member 20, a second member 30 and a pivotal member 40.

The first member 20 has a first pivotal lug 21 provided with a first pivotal hole 211 extending along a reference pivotal axis L.

The second member 30 has a second pivotal lug 31 and a third pivotal lug 32. The first pivotal lug 21 is disposed between the second pivotal lug 31 and the third pivotal lug 32. The second pivotal lug 31 is provided with a second pivotal hole 311 including a first engaging portion 312 and a limiting groove 313 formed in an inner periphery thereof. A limiting member 314 is arranged in the limiting groove 313. The third pivotal lug 32 is provided with a third pivotal hole 321.

The pivotal member 40 is movably inserted through the first pivotal hole 211, the second pivotal hole 311 and the third pivotal hole 321 to movable between a locked position and an unlocked position. The pivotal member 40 includes a second engaging portion 41, a first positioning groove 42 and a second positioning groove 43 formed in an outer periphery thereof. When the pivotal member 40 is in the locked position, the second engaging portion 41 is engaged with the first engaging portion 312, and the limiting member 314 is engaged within the first positioning groove 42, so that the first member 20 and the second member 30 cannot pivot relative to each other. When the pivotal member 40 is in the unlocked position, the limiting member 314 is engaged within the second positioning groove 43, so that the first member 20 and the second member 30 are pivotable relative to each other.

The second pivotal lug 31 has a first thickness W1 in an axial direction of the pivotal member 40, and the third pivotal lug 32 has a second thickness W2 in the axial direction of the pivotal member 40. The second thickness W2 is less than the first thickness W1.

The limiting groove 313 is arranged adjacent to one side of the first engaging portion 312 distal to the first pivotal lug 21.

The first pivotal hole 211 includes a third engaging portion 212 formed in an inner periphery thereof. The pivotal member 40 further includes fourth engaging portion 44 formed in an outer periphery thereof. When the pivotal member 40 is moved between the locked position and the unlocked position, the fourth engaging portion 44 is constantly engaged with the third engaging portion 212. When the pivotal member 40 is in the unlocked position, the second engaging portion 41 is disengaged from the first engaging portion 312, so that the pivotal member 40 and the first member 20 are synchronously rotatable relative to the second member 30.

The third pivotal hole 321 includes a fifth engaging portion 322 formed in an inner periphery thereof. When the pivotal member 40 is in the locked position, the fourth engaging portion 44 is simultaneously engaged with the third engaging portion 212 and the fifth engaging portion 322. When the pivotal member 40 is in the unlocked position, the fourth engaging portion 44 is disengaged from the fifth engaging portion 322.

The second pivotal hole 311 further includes a containing portion 315 formed in the inner periphery thereof. The containing portion 315 is adjacent to the first engaging portion 312 and located between the first engaging portion 312 and the limiting groove 313. When the pivotal member 40 is in the unlocked position, the second engaging portion 41 is disengaged from the first engaging portion 312 and arranged in the containing portion 315, so that the second engaging portion 41 and the containing portion 315 are spaced and not engaged each other.

A stopping member 323 is arranged in the third pivotal hole 321 and disposed at one side of the fifth engaging portion 322 distal to the first pivotal lug 21. When the pivotal member 40 is in the locked position, the fourth engaging portion 44 is near the stopping member 323. When the pivotal member 40 is in the unlocked position, the fourth engaging portion 44 is distal to the stopping member 323.

The second engaging portion 41 includes a toothed portion having a dedendum circle diameter D in a radial direction of the pivotal axis L. The first positioning groove 42 has a first diameter D1 in the radial direction of the pivotal axis L, and the first diameter D1 is equal to or less than the dedendum circle diameter D. The second positioning groove 43 has a second diameter D2 in the radial direction of the pivotal axis 1, and the second diameter D2 is equal to or less than the dedendum circle diameter D.

Therefore, the indexable wrench 10 can steadily position the pivotal member 40 at the locked position or the unlocked position. The first member 20 and the second member 30 may be positioned at various relative angles to correspond to different environments and conditions to turn a driven object. The indexable wrench 10 is also be used when the first member 20 and the second member 30 pivot relative to each other. The second pivotal lug 31 mainly provide the effect of positioning the position of the pivot shaft 40, so that the torque transmission of the second member 30 will be lopsided to the second pivotal lug 31, utilizing the design that the first thickness W1 of the second pivotal lug 31 is thicker than the second thickness W2 of the third pivotal lug 32, compared with the traditional pivot joint structure with equal thickness of both lugs, the indexable wrench 10 can provide better structural strength and improve torque output.

Figure 6:
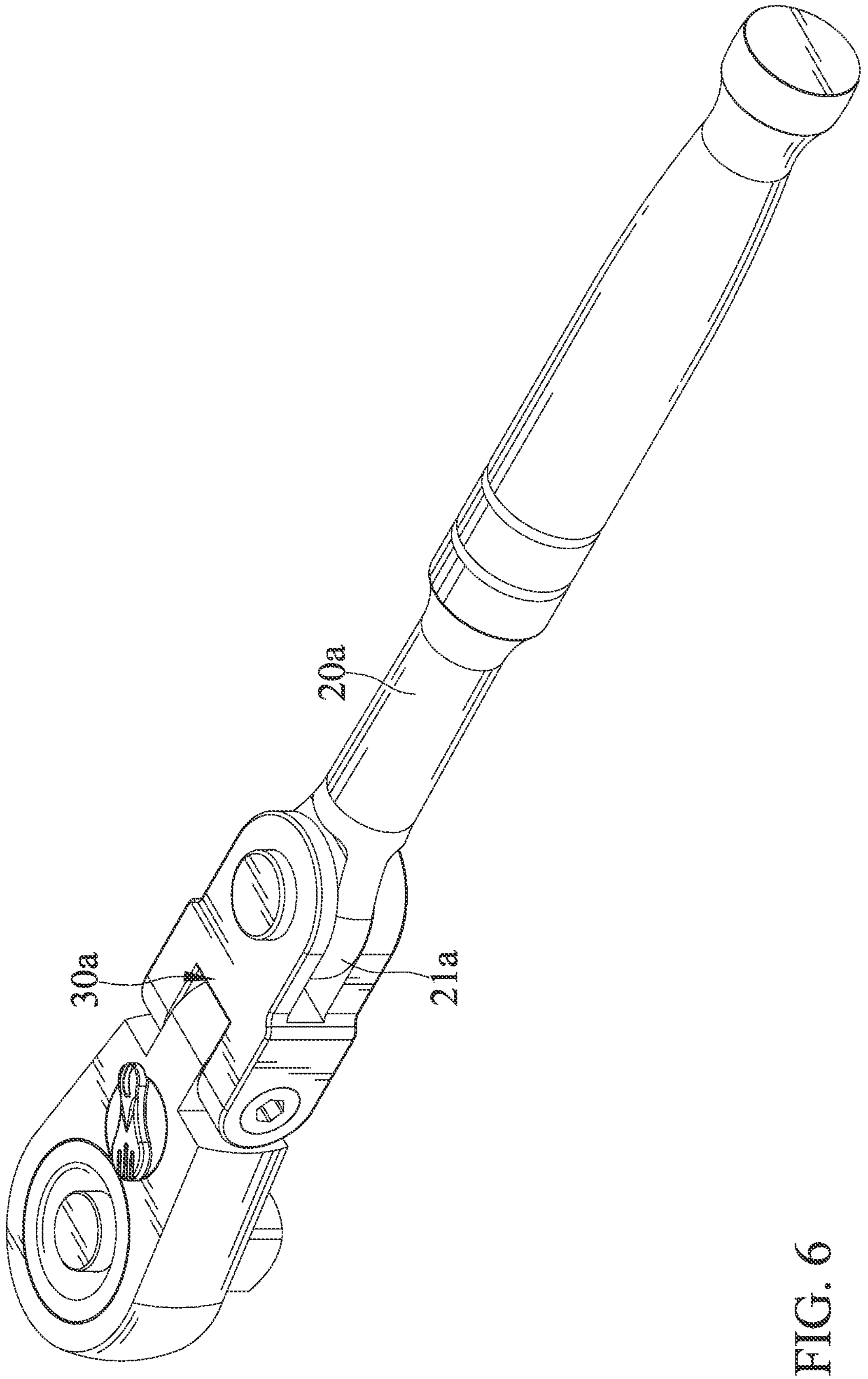
FIG. 6 is a perspective view of an indexable wrench of a second embodiment according to the present invention.
Figure 7:
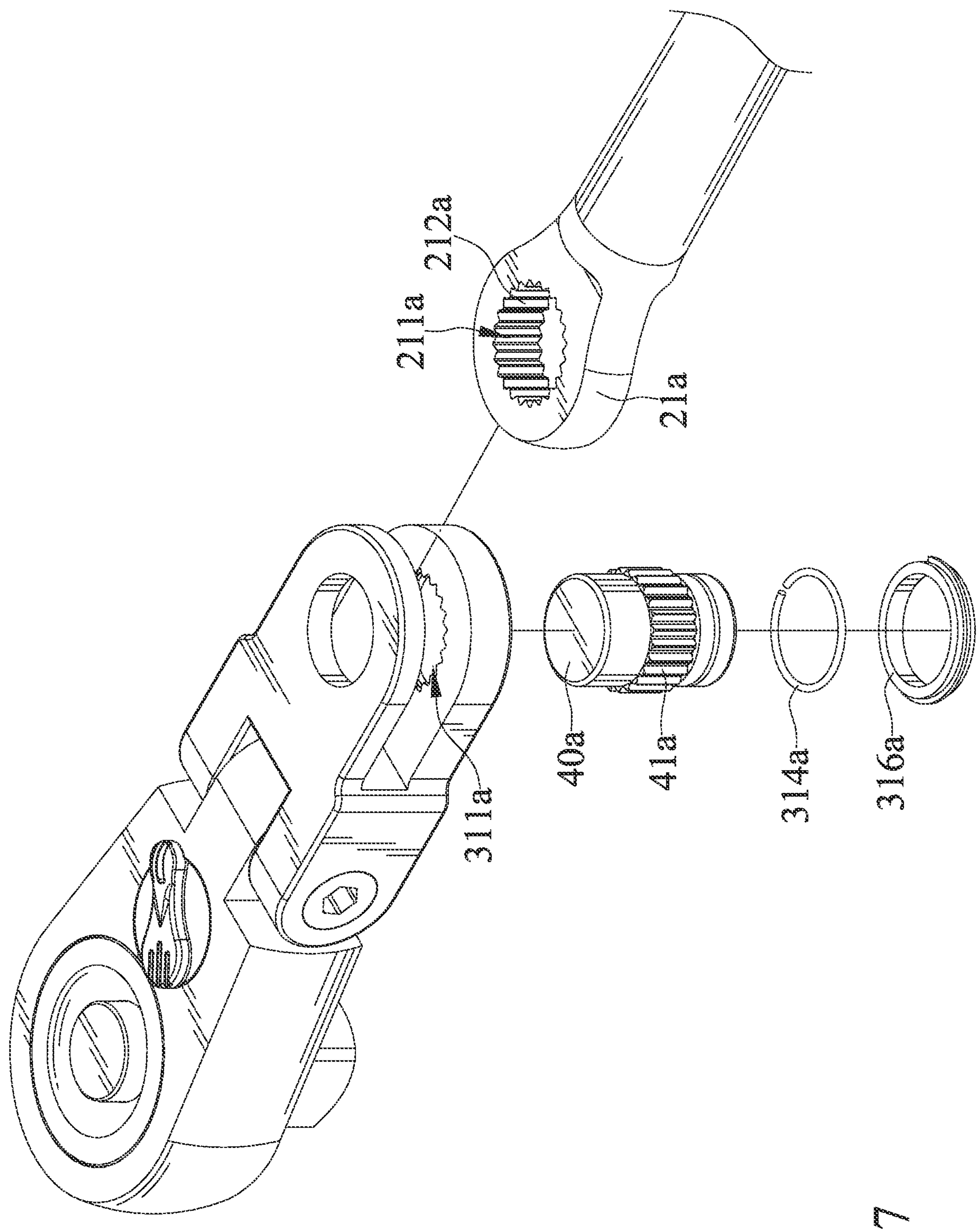
FIG. 7 is a partial, exploded perspective view of the indexable wrench of FIG. 6.
Figure 8:
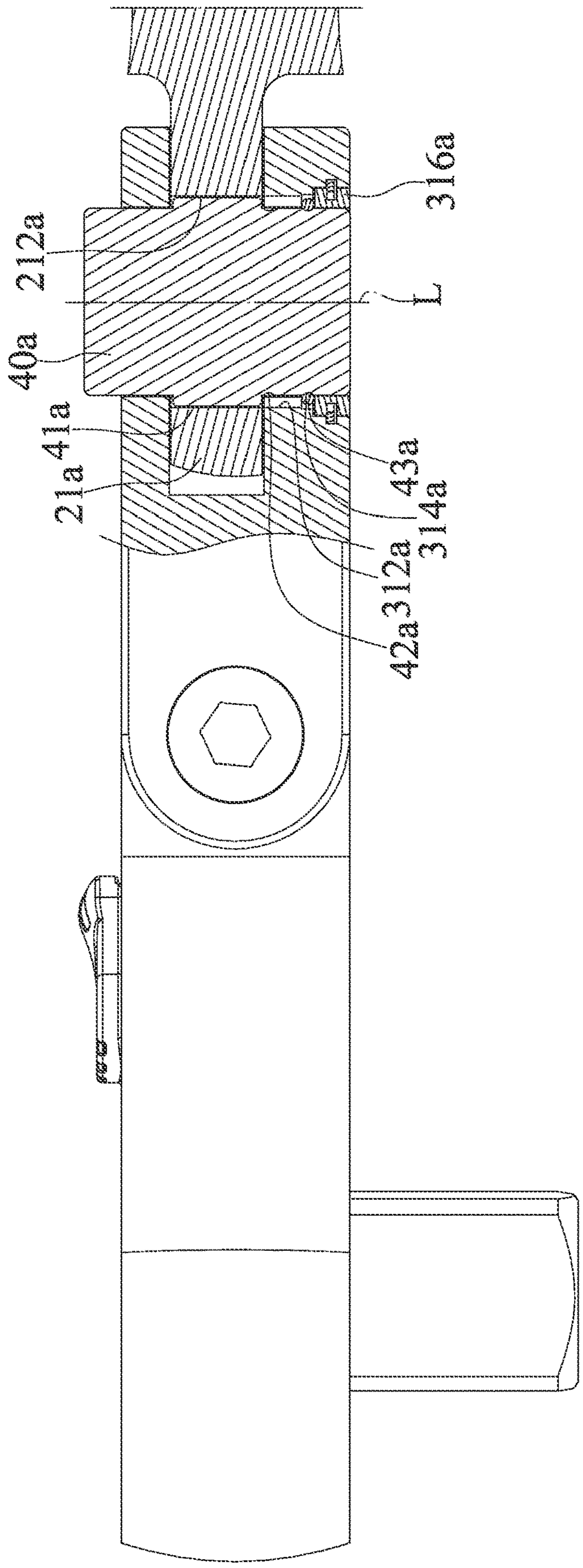
FIG. 8 is a cross sectional view of the indexable wrench of FIG. 6 and shows an pivotal member is in an unlocked position.
Figure 9:
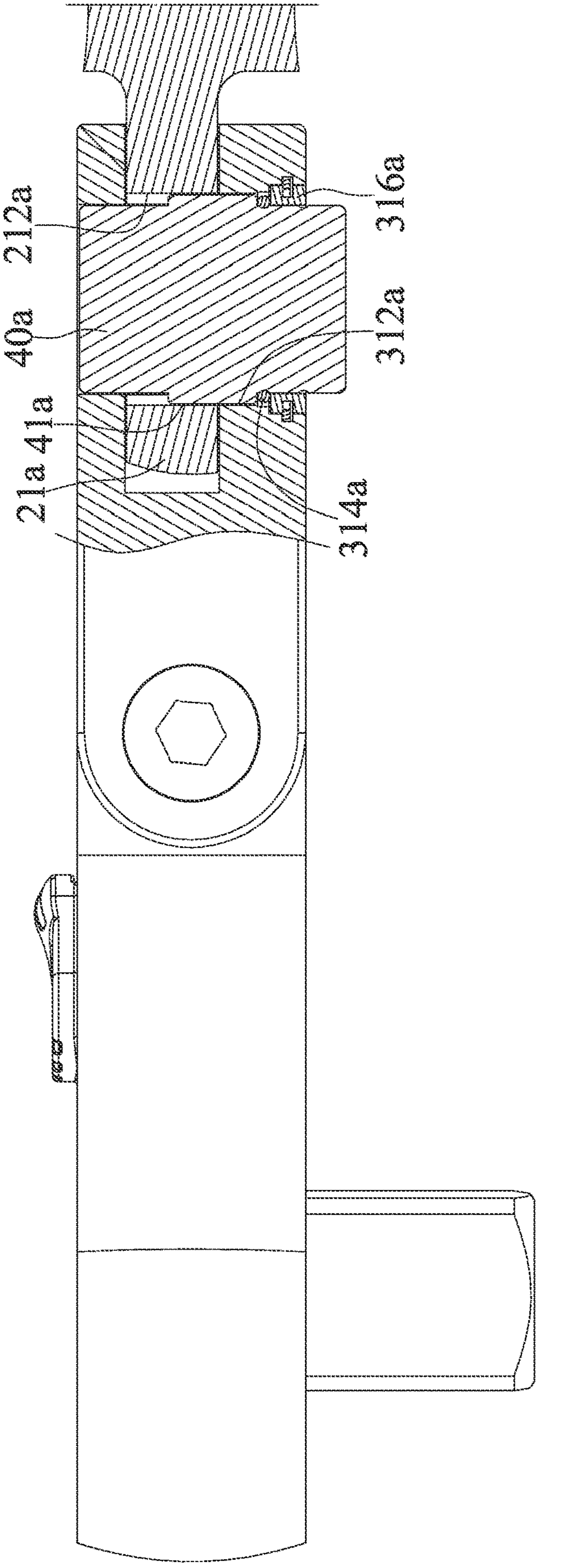
FIG. 9 is a cross sectional view of the indexable wrench of FIG. 6 and shows the pivotal member is in an locked position.
Figure 10:
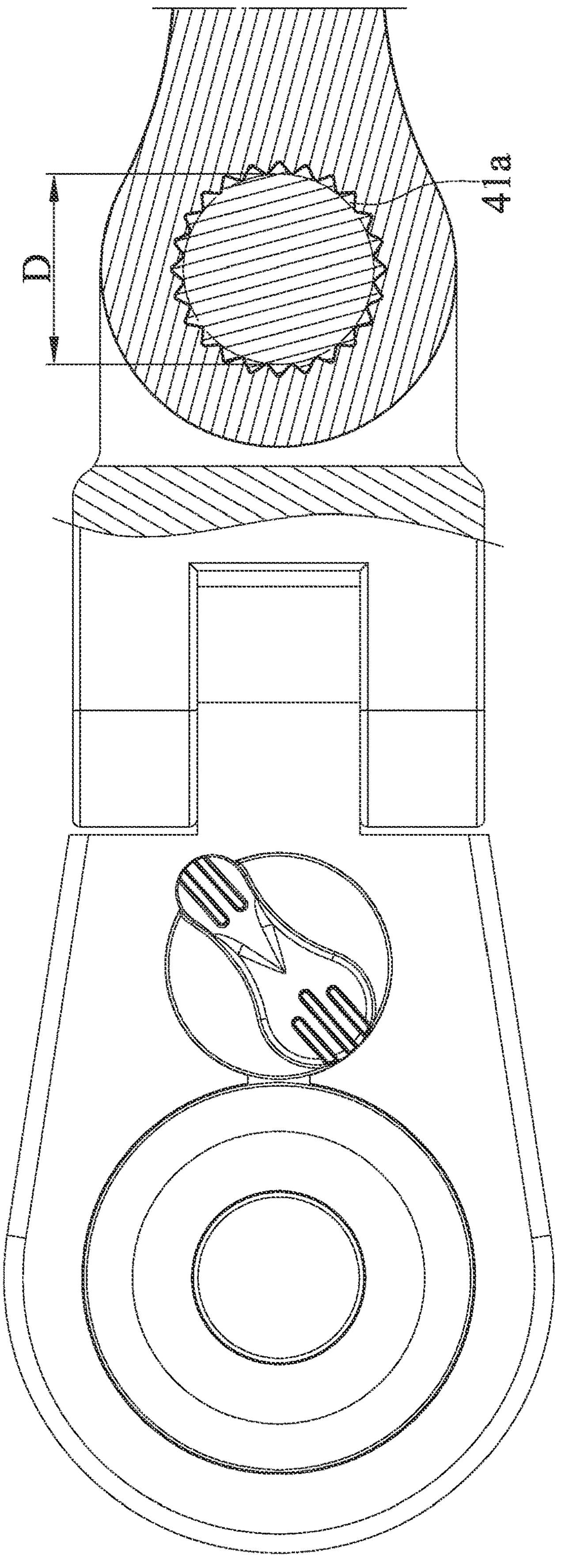
FIG. 10 is another cross sectional view of the indexable wrench of FIG. 6 and shows a second engaging portion with a toothed portion having a dedendum circle diameter.

FIGS. 6-10 show an indexable wrench of a second embodiment according to the present invention. The second embodiment is substantially the same as the first embodiment but is mainly different from the first embodiment by that the first pivotal hole 211*a* includes a third engaging portion 212*a* formed in an inner periphery thereof. When the pivotal member 40*a* is moved between the locked position and the unlocked position, the second engaging portion 41*a* is constantly engaged with the third engaging portion 212*a*. When the pivotal member 40*a* is in the unlocked position, the second engaging portion 41*a* is disengaged from the first engaging portion 312*a*, so that the pivotal member 40*a* and the first member 20*a* are synchronously rotatable relative to the second member 30*a*.

Further, a stopping member 316*a* is arranged in the second pivotal hole 311*a* and abutted against one side of the limiting member 314*a* distal to the first pivotal lug 21*a*. When the pivotal member 40*a* is in the locked position, the second engaging portion 41*a* is near the stopping member 316*a*. When the pivotal member 40*a* is in the unlocked position, the second engaging portion 41*a* is distal to the stopping member 316*a*.

Although specific embodiments have been illustrated and described, numerous modifications and variations are still possible without departing from the scope of the invention. The scope of the invention is limited by the accompanying claims.

The invention claimed is:

1. An indexable wrench comprising:

a first member having a first pivotal lug, wherein the first pivotal lug is provided with a first pivotal hole extending along a reference pivotal axis, wherein the first pivotal hole includes a third engaging portion formed in an inner periphery thereof;

a second member having a second pivotal lug and a third pivotal lug, wherein the first pivotal lug is disposed between the second pivotal lug and the third pivotal lug, wherein the second pivotal lug is provided with a second pivotal hole, wherein the second pivotal hole includes a first engaging portion and a limiting groove formed in an inner periphery thereof, wherein a limiting member is arranged in the limiting groove, and wherein the third pivotal lug is provided with a third pivotal hole, wherein the second pivotal hole further includes a containing portion formed in the inner periphery thereof, wherein the containing portion is adjacent to the first engaging portion and located between the first engaging portion and the limiting groove; and a pivotal member movably inserted through the first pivotal hole, the second pivotal hole and the third pivotal hole to movable between a locked position and an unlocked position, wherein the pivotal member includes a second engaging portion, a first positioning groove and a second positioning groove formed in an outer periphery thereof;

wherein when the pivotal member is in the locked position, the second engaging portion is engaged with the first engaging portion, and the limiting member is engaged within the first positioning groove, and wherein the first member and the second member cannot pivot relative to each other;

wherein when the pivotal member is in the unlocked position, the second engaging portion is disengaged from the first engaging portion and arranged in the containing portion, and the limiting member is engaged within the second positioning groove, and wherein the second engaging portion and the containing portion are spaced and not engaged each other, the first member and the second member are pivotable relative to each other, and the pivotal member and the first member are synchronously rotatable relative to the second member;

wherein when the pivotal member is moved between the locked position and the unlocked position, the fourth engaging portion is constantly engaged with the third engaging portion.

2. The indexable wrench as claimed in claim 1, wherein the second pivotal lug has a first thickness in an axial direction of the pivotal member, wherein the third pivotal lug has a second thickness in the axial direction of the pivotal member, and wherein the second thickness is less than the first thickness.

3. The indexable wrench as claimed in claim 1, wherein the third pivotal hole includes a fifth engaging portion formed in an inner periphery thereof;

wherein when the pivotal member is in the locked position, the fourth engaging portion is simultaneously engaged with the third engaging portion and the fifth engaging portion;

wherein when the pivotal member is in the unlocked position, the fourth engaging portion is disengaged from the fifth engaging portion.

4. The indexable wrench as claimed in claim 3, wherein a stopping member is arranged in the third pivotal hole and disposed at one side of the fifth engaging portion distal to the first pivotal lug;

wherein when the pivotal member is in the locked position, the fourth engaging portion is near the stopping member;

wherein when the pivotal member is in the unlocked position, the fourth engaging portion is distal to the stopping member.

5. The indexable wrench as claimed in claim 1, wherein the second engaging portion includes a toothed portion having a dedendum circle diameter in a radial direction of the pivotal axis, wherein the first positioning groove has a first diameter in the radial direction of the pivotal axis, wherein the first diameter is equal to or less than the dedendum circle diameter, wherein the second positioning groove has a second diameter in the radial direction of the pivotal axis, and wherein the second diameter is equal to or less than the dedendum circle diameter.

6. The indexable wrench as claimed in claim 1, wherein the limiting groove is arranged adjacent to one side of the first engaging portion distal to the first pivotal lug.

* * * * *